2,957,829
PREPARATION OF LUMINESCENT MATERIAL

Mary V. Hoffman, South Euclid, Ohio, assignor to General Electric Company, a corporation of New York No Drawing. Filed June 17, 1958, Ser. No. 742,478

3 Claims. (Cl. 252—301.6)

This invention relates generally to luminescent materials and their preparation, and more particularly to a process for making a luminescent zinc aluminate phosphor activated by manganese whereby the luminous output of the phosphor is improved.

The present green component phosphor used in color television screens is willemite, a zinc silicate phosphor activated with manganese. The willemite is a very bright phosphor with a peak emission band at about 5250 A., and has a yellow-green emission band. When used in color television tubes employing a single electron gun, willemite is considerably brighter than the best commercially available red or the blue component phosphors. Therefore, the practice is to dilute the bright green with a nonluminous zinc silicate so as to lower the brightness. The zinc aluminate phosphor prepared according to the instant invention has an emission band peaking at about 5130 A. units when subjected to cathode ray radiation, and the color band is more narrow than the willemite band. This makes the zinc aluminate a more saturated green, which allows a greater range of colors to be obtained on the color television screen. Further, if the present zinc silicate could be diluted with zinc aluminate phosphor, the observed color of the green would probably be improved. Further, the afterglow of zinc aluminate is considerably less than that evidenced by zinc silicate.

The phosphor prepared according to the present invention is therefore useful as a luminescent material in cathode ray tube applications.

It is therefore a purpose of this invention to provide an improved method of preparing manganese activated zinc aluminate phosphor.

Briefly stated, the luminous output of a zinc aluminate phosphor activated by manganese may be improved by double firing the phosphor ingredients with a suitable flux, and introducing a small quantity of silicon dioxide to the batch ingredients between firings. The silicon dioxide may be introduced as a silicon dioxide liberating compound, such as silicic acid, hydrated silicon dioxide.

Zinc aluminate activated by manganese, without the addition of a flux, must be fired at a temperature of about 1600° C. However, I have found that the phosphor batch ingredients may be fired with a flux in a temperature range of about 1150° C. to 1350° C. The known fluxes which may be used and have been found to be suitable include sodium fluoride, cryolite ($AlF_3 \cdot 3NaF$) lead fluoride, tungstic acid, molybdenum trioxide and vanadium pentoxide, and mixtures thereof, such as lead fluoride and sodium fluoride, produces good results. No advantage has been found in brightness by firing the phosphor batch ingredients above 1350° C. The flux may be present in quantities of up to 2% of phosphor batch weight; the optimum quantity of flux is in the range of about 0.1% to about 0.5% by weight of the phosphor batch.

According to the invention, the addition between firings of silicon dioxide improves the brightness considerably. Silicon dioxide may be added in the form of silicic acid having about 10% by weight of $H_2O$, in the range of about 0.1% to 5% by weight of the first fired phosphor batch weight. If the silicon dioxide is added to the unfired batch material, it causes greatly reduced brightness; however, when, according to the present invention, it is added to the first fired batch material and then the batch material is refired, the phosphor brightness is greatly increased. Each firing may be from 2 to 4 hours duration. No advantage has been found in firing the phosphor in excess of 4 hours. This second firing may also be in the range of about 1150° C. to 1350° C.

It may be desirable, but it is not necessary, to add a small amount of ammonium chloride to the batch between the firings.

The optimum range of zinc oxide to aluminum oxide is one which has a slight excess of aluminum oxide, for example, a mole ratio of 1:1.1. However, ranges of zinc oxide to aluminum oxide in the mole ratio of 1:1 to 1:1.5 have been tried and produce satisfactory results; it is probable that this ratio may be varied as high as 1:2 and still produce a good phosphor.

The manganese may be present in the range of from 0.002 to 0.020 mole of manganese per mole of zinc oxide; 0.010 mole of manganese per mole of zinc oxide appears to produce optimum results.

By way of example, but not limitation, a suitable phosphor may be prepared according to the present invention by combining in the phosphor batch the following ingredients:

*Phosphor batch ingredients*

|  | Gms. | Percent by wt. | Moles |
|---|---|---|---|
| ZnO | 81.4 | 32 | 1 |
| $Al_2O_3 \cdot 3H_2O$ | 171.6 | 67.5 | 1.1 |
| $MnCO_3$ | 1.15 | 0.45 | .010 |

To the above batch is added 1.27 gms. of lead fluoride, or 0.5% by weight of the phosphor batch ingredients. The batch is then fired in open trays in air at 1250° C. for about three hours. 3.88 gms., or 2.0% by weight of the first-fired batch, of silicic acid ($SiO_2$ hydrated with about 10% of its weight of $H_2O$) is added and milled into the batch. The batch is then refired at 1250° C. in air in open trays for a period of three hours. After the second firing with the $SiO_2$ addition, the phosphor exhibited an increase in brightness of 15 to 20%.

According to the invention, the luminous response of a zinc aluminate phosphor activated by manganese is improved by the addition of silicon dioxide between the firings.

What I claim as new and desire to secure by Letters Patent of the United States is:

1. The method of preparing a green emitting manganese activated zinc aluminate phosphor which comprises firing at a temperature in the range of about 1150° C. to 1350° C. for about two to four hours a batch consisting essentially of zinc oxide and aluminum oxide in a mole ratio of 1:1 to 1:2, an activating manganese compound in an amount of about 0.002 to 0.020 mole per mole of the zinc oxide, and up to about 2% by weight of the batch of a suitable flux, mixing the resultant composition with about 0.1% to 5% by weight of silicic acid and refiring at about 1150° C.–1350° C. for about two to four hours.

2. The method of preparing a green emitting manganese activated zinc aluminate phosphor comprising the steps of mixing the phosphor batch ingredients in the ratio of 32% by weight of zinc oxide, 67.5% by weight of aluminum oxide-tri-hydrate, and 0.45% by weight of manganese carbonate, adding 0.5% by weight of the unfired batch of a suitable flux, firing the above mixture at 1250°

C. for three hours, adding 2% by weight of the first fired batch of silicic acid, and refiring the mixture at 1250° C. for about three hours.

3. A method of improving the luminescent response of a green emitting manganese activated zinc aluminate phosphor containing zinc oxide and aluminum oxide in a mole ratio of about 1:1 to 1:2 and manganese in an amount of about 0.002 to 0.020 mole per mole of the zinc oxide comprising the steps of milling therewith silicic acid in the range of about 0.1% to 5% by weight of the phosphor, and refiring the mixture in the range of 1150° C. to 1350° C. for about two to four hours.

References Cited in the file of this patent

FOREIGN PATENTS

| | | |
|---|---|---|
| 525,134 | Great Britain | Aug. 22, 1940 |
| 544,444 | Great Britain | Apr. 14, 1942 |